F. WHITNEY.
HUB CAP.
APPLICATION FILED MAR. 29, 1911.
1,037,814.
Patented Sept. 3, 1912.
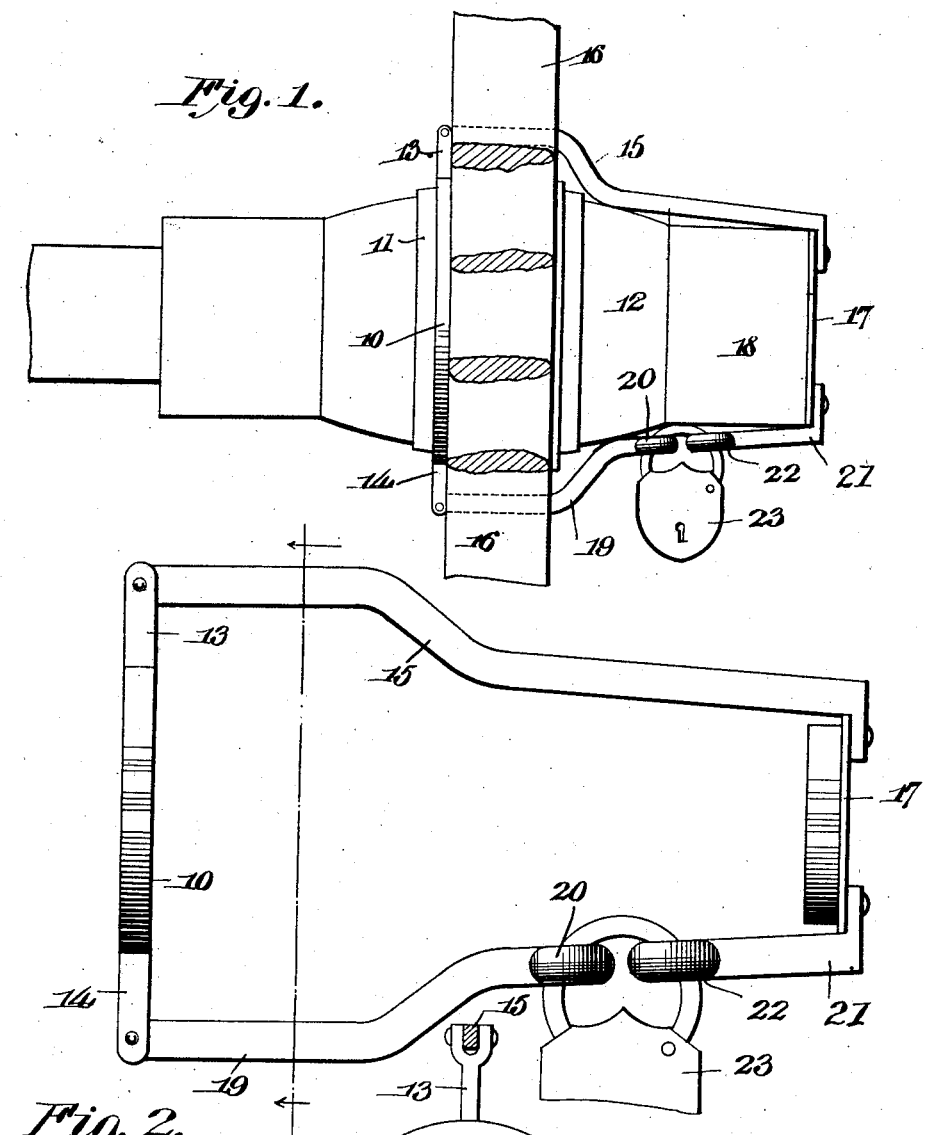
WITNESSES.
INVENTOR
Francis Whitney,
BY Victor J. Evans.
ATTORNEY.

UNITED STATES PATENT OFFICE.

FRANCIS WHITNEY, OF HOPKINTON, NEW YORK.

HUB-CAP.

1,037,814.  Specification of Letters Patent.  Patented Sept. 3, 1912.

Application filed March 29, 1911. Serial No. 617,729.

*To all whom it may concern:*

Be it known that I, FRANCIS WHITNEY, a citizen of the United States, residing at Hopkinton, in the county of St. Lawrence and State of New York, have invented new and useful Improvements in Hub-Caps, of which the following is a specification.

An object of the invention is to provide a device for attachment to vehicle hubs to retain the hub band in position on the hub.

The invention embodies, among other features, a device for retaining the hub band on the hub of the vehicle wheel, a cap being provided to close the outer extremity of the hub, thus preventing dust or dirt from entering the hub, means being provided for retaining the cap in locked position relatively to the hub.

Reference is to be had to the accompanying drawings constituting a part of this specification, in which similar characters of reference denote corresponding parts in all the views, and in which—

Figure 1 is a side elevation of a portion of a vehicle wheel, showing the hub and my device applied thereto. Fig. 2 is a side elevation of my device showing the same removed from the hub. Fig. 3 is a vertical sectional view.

Referring more particularly to the views, I provide a ring 10 for engagement with the periphery of an inner flange 11 of the hub 12. Connected to the outer side of the ring 10 and extending diametrically outward are a plurality of bifurcated bearing lugs 13, 14, the lug 13 having pivotally mounted thereon a curved retaining bar 15 extending between the spokes 16 of the hub and having mounted at the outer end thereof a cap 17 adapted to fit over the outer end of an outer hub band 18 of the hub 12. Pivotally mounted on the lug 14 is a locking bar 19 having a loop 20 formed at the outer end thereof and a second locking bar 21 is mounted on the cap 17 and has an end thereof provided with a loop 22, the said loops 20 and 22 of the respective locking bars 19 and 21 being adapted to receive therethrough a portion of a padlock 23 for releasably locking the locking bars 19 and 21.

Referring to the figures, it will be readily seen that the cap 17 will be retained in locked position, thus preventing the hub band from being disengaged from the vehicle hub and also preventing the entrance of any dirt or dust into the inner side of the hub.

Having thus fully described the invention, what I claim as new, is:—

1. In a hub cap the combination with a ring, of a plurality of bifurcated bearing lugs extending diametrically outward from the said ring, a retaining bar mounted to swing on one of the said lugs, the cap secured to the free end of the said bar, a locking bar mounted to swing on the other bearing lug and terminating at the free end thereof in a loop, a second locking bar secured to the said cap and terminating at the free end thereof in a loop, and a lock for connection with the said loops to retain the said locking bars in locked relation.

2. In a hub cap the combination with a ring, of a retaining bar mounted to swing thereon, a cap secured to the free end of the said retaining bar, a locking bar mounted to swing on the said ring, a second locking bar secured to the said cap and means for engagement with the said locking bars to retain the same in locked relation.

3. In a hub cap the combination with a ring, of a retaining bar mounted to swing thereon, a cap secured to the free end of the said retaining bar, a locking bar mounted to swing on the said ring, a second locking bar secured to the said cap and a lock for connection with the said locking bars for retaining the same in locked relation.

In testimony whereof I affix my signature in presence of two witnesses.

FRANCIS WHITNEY.

Witnesses:
 CARRIE L. MERRILL,
 GEORGE M. BROWN.

Copies of this patent may be obtained for five cents each, by addressing the "Commissioner of Patents, Washington, D. C."